United States Patent
Arboleda Parra et al.

(10) Patent No.: US 10,568,315 B2
(45) Date of Patent: Feb. 25, 2020

(54) DOMESTIC INSECT TRAP

(71) Applicant: UNIVERSIDAD INDUSTRIAL DE SANTANDER, Bucaramanga (CO)

(72) Inventors: Luz Marina Arboleda Parra, Bucaramanga (CO); Laura Vanessa Bueno Capacho, Bucaramanga (CO); Héctor Julio Parra Moreno, Bucaramanga (CO); Jonny Edward Duque Luna, Bucaramanga (CO)

(73) Assignee: Universidad Industrial de Santander, Bucaramanga (CO)

( * ) Notice: Subject to any disclaimer, the term of this patent is extended or adjusted under 35 U.S.C. 154(b) by 253 days.

(21) Appl. No.: 15/525,945

(22) PCT Filed: Nov. 10, 2015

(86) PCT No.: PCT/IB2015/058685
§ 371 (c)(1),
(2) Date: Aug. 1, 2017

(87) PCT Pub. No.: WO2016/075624
PCT Pub. Date: May 19, 2016

(65) Prior Publication Data
US 2017/0354136 A1    Dec. 14, 2017

(30) Foreign Application Priority Data
Nov. 10, 2014 (CO) .................................. 14-248190

(51) Int. Cl.
*A01M 1/02*    (2006.01)
*A01M 1/14*    (2006.01)
*A01M 1/10*    (2006.01)

(52) U.S. Cl.
CPC .............. *A01M 1/145* (2013.01); *A01M 1/02* (2013.01); *A01M 1/106* (2013.01); *A01M 1/14* (2013.01)

(58) Field of Classification Search
CPC .......... A01M 1/02; A01M 1/106; A01M 1/14; A01M 1/145; A01M 1/2016
(Continued)

(56) References Cited

U.S. PATENT DOCUMENTS 105,963 A * 8/1870 Merk .................... A01M 1/106
43/122
3,708,908 A 1/1973 Levey
(Continued)

*Primary Examiner* — David J Parsley
(74) *Attorney, Agent, or Firm* — The Morales Law Firm; Joseph L. Morales

(57) ABSTRACT

The present invention consists of a collapsible trap for insects, particularly male and female *Aedes aegypti* mosquitoes, the trap preferably being made of card and designed for use in a domestic or commercial environment. Specifically, the present invention discloses a foldable trap for insects, particularly male and female *Aedes aegypti* mosquitoes, the trap being formed by a hollow, prismatic main body which comprises an upper cover and a lower cover. The hollow, prismatic main body also comprises a translucent window in one of the sides, the internal surface of which translucent window is impregnated with an adhesive for insects. An attractive mosquito bait is located inside the hollow main body. The mosquitoes, attracted by the bait, enter the trap through at least one curved interior conduit which is located inside the hollow main body and has an entrance in the upper cover and an exit inside the trap.

16 Claims, 6 Drawing Sheets

(58) Field of Classification Search
USPC .................. 43/114, 122, 124, 131, 132.1
See application file for complete search history.

(56) References Cited

U.S. PATENT DOCUMENTS

| | | | | |
|---|---|---|---|---|
| 4,283,878 A * | 8/1981 | Hill | ............... | A01M 1/023 |
| | | | | 43/114 |
| 4,442,624 A * | 4/1984 | Browne | ............... | A01M 1/02 |
| | | | | 43/107 |
| 4,592,163 A | 6/1986 | Wilson | | |
| 4,718,193 A * | 1/1988 | Rosselli | ............... | A01M 1/02 |
| | | | | 43/122 |
| 4,793,092 A * | 12/1988 | Avittan | ............... | A01M 1/02 |
| | | | | 43/107 |
| 6,164,009 A * | 12/2000 | Clarke | ............... | A01M 1/106 |
| | | | | 43/107 |
| 6,502,347 B1 | 1/2003 | Carver | | |
| 6,625,922 B1 * | 9/2003 | Ernsberger, IV | ....... | A01M 1/02 |
| | | | | 43/107 |
| 7,082,712 B2 * | 8/2006 | Harris | ............... | A01M 1/02 |
| | | | | 43/107 |
| 7,093,389 B1 * | 8/2006 | Meier | ............... | A01M 1/106 |
| | | | | 43/107 |
| 7,669,362 B2 * | 3/2010 | Cwiklinski | ............ | A01M 1/02 |
| | | | | 43/107 |
| 8,079,175 B2 | 12/2011 | Calkins et al. | | |
| 2006/0283075 A1 * | 12/2006 | Feldhege | ............... | A01M 1/02 |
| | | | | 43/114 |
| 2013/0047495 A1 * | 2/2013 | Frisch | ............... | A01M 1/10 |
| | | | | 43/114 |
| 2013/0067795 A1 * | 3/2013 | Wesson | ............... | A01M 1/106 |
| | | | | 43/107 |
| 2014/0000151 A1 | 1/2014 | Cowen | | |

* cited by examiner

DOMESTIC INSECT TRAP

1. FIELD OF THE INVENTION

The present invention relates to domestic insect traps, particularly domestic traps that allow for the capture and elimination of male and female *Aedes aegypti*, which transmit dengue.

2. DESCRIPTION OF PRIOR ART

Dengue is an infectious disease caused by a virus transmitted by the *Aedes aegypti* mosquito, deemed the virus vector, which becomes a virus carrier upon biting a person infected with the virus.

Transmission of the dengue virus can occur in and around homes. Urban areas exhibit a higher number of cases, due to a high population density of humans and of the vector. Another public deficiency that exacerbates the problem is the lack of a proper supply of drinking water. This deficiency compels people, who live in these conditions, to store water in containers, without taking proper precautions in some cases which ultimately results in more breeding grounds for the vector.

Appropriate control of the reproduction of the dengue vector leads to a steady decline in the risk of disease transmission in these communities. Studies that simulate epidemic control and management show that the greatest efficacy is achieved by simultaneously attacking the larval stage as well as the adult stage of the vector, which lends support to the idea that comprehensive control (in which all stages of development of the vector are attacked) is the most efficient method for reducing the number of cases of a disease.

In countries with a high risk of dengue outbreaks, many fatal cases are recorded every year. The control programs currently implemented by government entities monitor the mosquito population presence: when this value is close to 0%, the virus will not exhibit a high incidence, but as it approaches 5%, it is recommended that the appropriate steps be taken to control and eradicate the vector in specified areas. These programs provided to communities seek to establish guidelines for the management and control of areas with a high risk of vector growth, based on educational programs, fumigation, and eradication of breeding grounds in and around homes. However, the observed failure to control disease vectors is due to the fact that community member participation has consisted of ineffective attempts to eradicate mosquito populations, including the sale and supply of household elements, insecticides, repellents, aerosols or fumigators, which are ineffective despite being means of control, since they require the constant attention of the user, that is to say, the user must continue to install replacements, power supplies, and pay constant attention in order for these interventions to yield acceptable results.

Most of the traps currently available on the market feature added elements or complex operational systems, which result in high costs and difficult maintenance, both of which make them less accessible to low-income communities, where the incidence of dengue is higher.

Similarly, some trap models do provide simple and cost-effective alternatives for the control of insects in domestic environments, but they are not suitable to the capture of females of the *Aedes aegypti* mosquito, which transmit dengue.

U.S. Pat. No. 4,592,163 discloses a multipurpose, collapsible cardboard box composed of telescopically connected inner and outer members, used as a disposable insect trap, in a preferred embodiment. The inner container member has closed bottom and lateral walls, and a funnel-shaped top wall. The outer cover member is telescopically mounted over the inner container and includes a closed top, an open bottom, and lateral walls having open windows therein. When the cardboard box is open, insects are lured by the bait to enter through the windows and crawl down through the funnel into the container, where they are trapped.

When full, the cardboard box is closed by slipping the cover down around the inner container, and the unit is discarded. When opened, the cover member remains attached over the inner member by a simple locking mechanism.

Although the trap disclosed in U.S. Pat. No. 4,592,163 features a funnel that functions as a guide to allow insects to enter the closed container and become trapped, according to experts, this system would allow insects to escape the trap, using light as their guide.

Another relevant document, which discloses a cost-efficient, domestic mosquito trap, is US20140000151, which discloses a collapsible insect trap that solves the problem of conventional insect traps that occupy a large amount of space in storage. The collapsible insect trap can be flattened in order to eliminate the dead space in the product container, resulting in a product that not only occupies less space in shipping, in storage and at the point of sale, but also has a lower production cost compared to conventional insect traps. In this case, the cardboard trap is completely collapsible, with an assembly system consisting of flaps on its top and bottom and an adhesive on the lateral walls to trap the insects. The adhesive is on the outside of the trap; insects are simply attracted by the bait, bump into the lateral walls and become adhered thereto. This embodiment is not indicated for attracting female mosquitoes that have already bitten a host or mosquitoes searching for a body of water to deposit their eggs, since it does not simulate an attractive environment for the females of the *Aedes aegypti* mosquito, and therefore not optimal for the control of the dengue vector.

The prior art demonstrates the need for a system to capture and kill insects, and particularly, to capture and kill the mosquito vector of dengue, by means of a practical, cost-effective, biodegradable and disposable system that requires no power. Said system is expected to be competitive on the market, since it does not incur additional costs of consumption, such as constant replacements and power sources, which will make it accessible to all of the affected population.

3. BRIEF DESCRIPTION OF THE FIGURES

4. BRIEF DESCRIPTION OF THE INVENTION

Figure 1:
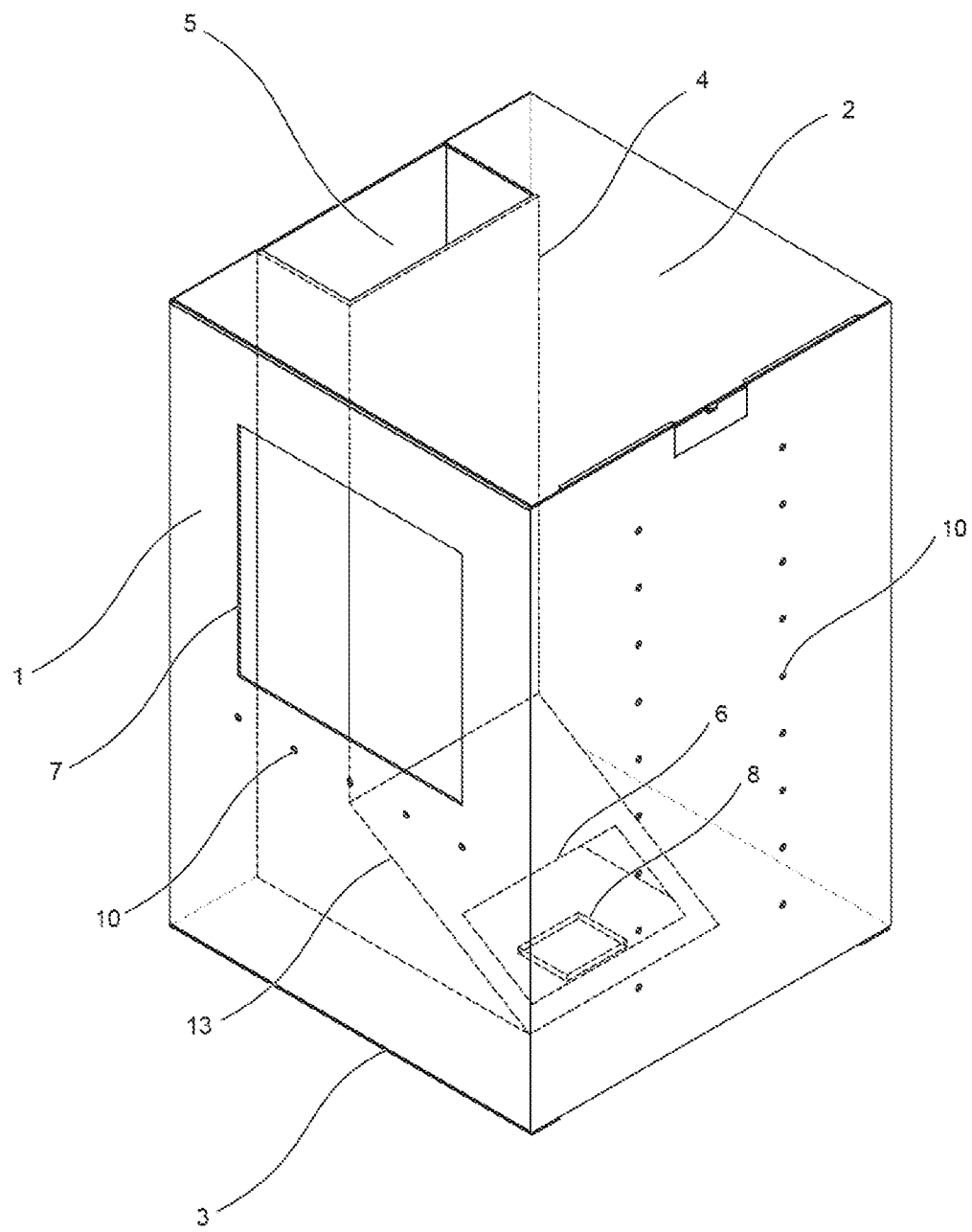
FIG. 1 shows a perspective view of one embodiment of the trap and its components.

The present invention consists of a collapsible trap for insects, particularly males or females of the *Aedes aegypti* mosquito, preferably made out of cardboard and developed for implementation in a commercial or domestic environment.

The present invention discloses a collapsible trap for insects, particularly males and females of the *Aedes aegypti* mosquito, composed of a prism-shaped main hollow body having a top lid and a bottom lid. Said prism-shaped main hollow body has a translucent window in one of its walls; the internal surface of said window is coated with an adhesive for insects. Bait for attracting mosquitoes is placed inside the main hollow body; this bait attracts mosquitoes into the trap through at least one curved inner duct located inside the main hollow body, with an entrance in the top lid and an exit within the trap.

Furthermore, the curved inner duct of the trap functions as a disorientation mechanism by failing to provide a direct line of sight between the open upper entrance and the exit, in such a way that when mosquitoes enter the curved inner duct attracted by the bait, they cease to perceive the light that enters the open upper entrance, and are only able to perceive the light that shines through the translucent window at the exit. Said light guides mosquitoes toward the inside of the trap; these later try to escape through the translucent window, only to be trapped at the internal surface of said translucent window, which is coated with adhesive for insects.

5. DETAILED DESCRIPTION OF THE INVENTION

The embodiments presented in the subject invention are described by making reference to FIGS. 1 through 6, but it should be understood that the claimed inventive concept can be embodied in a plurality of specific forms without deviating from the concept or the scope of the present invention.

The present invention consists of a collapsible trap for insects, particularly male and female *Aedes aegypti* mosquitoes, preferably manufactured from a paper-like material, which in some embodiments can be cardboard, developed for implementation in domestic environments.

The present invention functions by means of three concepts: the first is the attraction of the subject (mosquito), the second is the capture thereof, and the third is the death thereof.

Visual stimuli and chemical stimuli emitted by the bait are used as attraction mechanisms. The visual stimulus employed by the present invention is two contrasting colors; in one preferred embodiment, red is used for the main hollow body (1), and black is used exclusively to highlight the open upper entrance (5). The contrast of red and black has been experimentally proven to be the most attractive to mosquitoes.

Insects are captured by means of disorientation systems, which may consist of internal labyrinths, or in the case of the preferred embodiment of the invention, at least one curved inner duct (4), which is a system in which mosquitoes lose their sense of direction upon entering the trap, since they cease to perceive the light that slips through the entrance.

Finally, regarding the death of the mosquitoes, after they are captured in the trap and are unable to escape, the trap allows for the elimination of mosquitoes therein. The same systems used to capture mosquitoes allow for their death. Through the disorientation mechanisms, the *Aedes aegypti* mosquitoes reach a system for their death, whether by suffocation or by means of biodegradable adhesives.

Thus, the present invention provides a trap with features that attract insects, particularly *Aedes aegypti* mosquitoes, for safe capture and elimination thereof, which is also suitable for domestic use.

FIG. 1 shows that the trap is composed of a main hollow body (1), a top lid (2), a bottom lid (3), a translucent window (7) located in the main hollow body (1), mosquito bait (8) located inside the main hollow body (1) and a curved inner duct (4), located inside said curved inner duct (1), where the upper end of said curved inner duct (4) is operationally connected to an open upper entrance (5) in said top lid (2), and the lower end has an exit (6) into the main hollow body (1), wherein the curvature of the curved inner duct (4) does not provide a direct line of sight between the open upper entrance (5) and the exit (6). In an embodiment of the invention not illustrated herein, the trap may also have multiple open upper entrances (5), connected to multiple curved inner ducts (4), where all of the curved inner ducts (4) lead to a single bait (8), and may share an exit (6), or each curved inner duct (4) may have its own exit (6).

In one embodiment, the trap has visual attraction elements; said elements create a contrast between black and red colors, wherein the external walls of the main hollow body (1) and the external walls of the top lid (2) and the bottom lid (3) are red, and the curved inner duct (4) and the edges of the open upper entrance (5) are black.

This color contrast causes mosquitoes to be attracted by the black color that highlights the open upper entrance (5), that functions as an entrance to the curved inner duct (4), which then guides the mosquitoes toward the interior of the trap. Furthermore, another attraction system of the present invention consists of bait (8) placed inside the trap; in one embodiment of the invention, the bait (8) consists of a series of substances that mimic substances present on human skin, which is why it attracts mosquitoes, making it a suitable addition to the domestic trap. The bait (8) is located on the internal surface of the bottom lid (3), attached thereto by means of double-sided tape.

Figure 2:
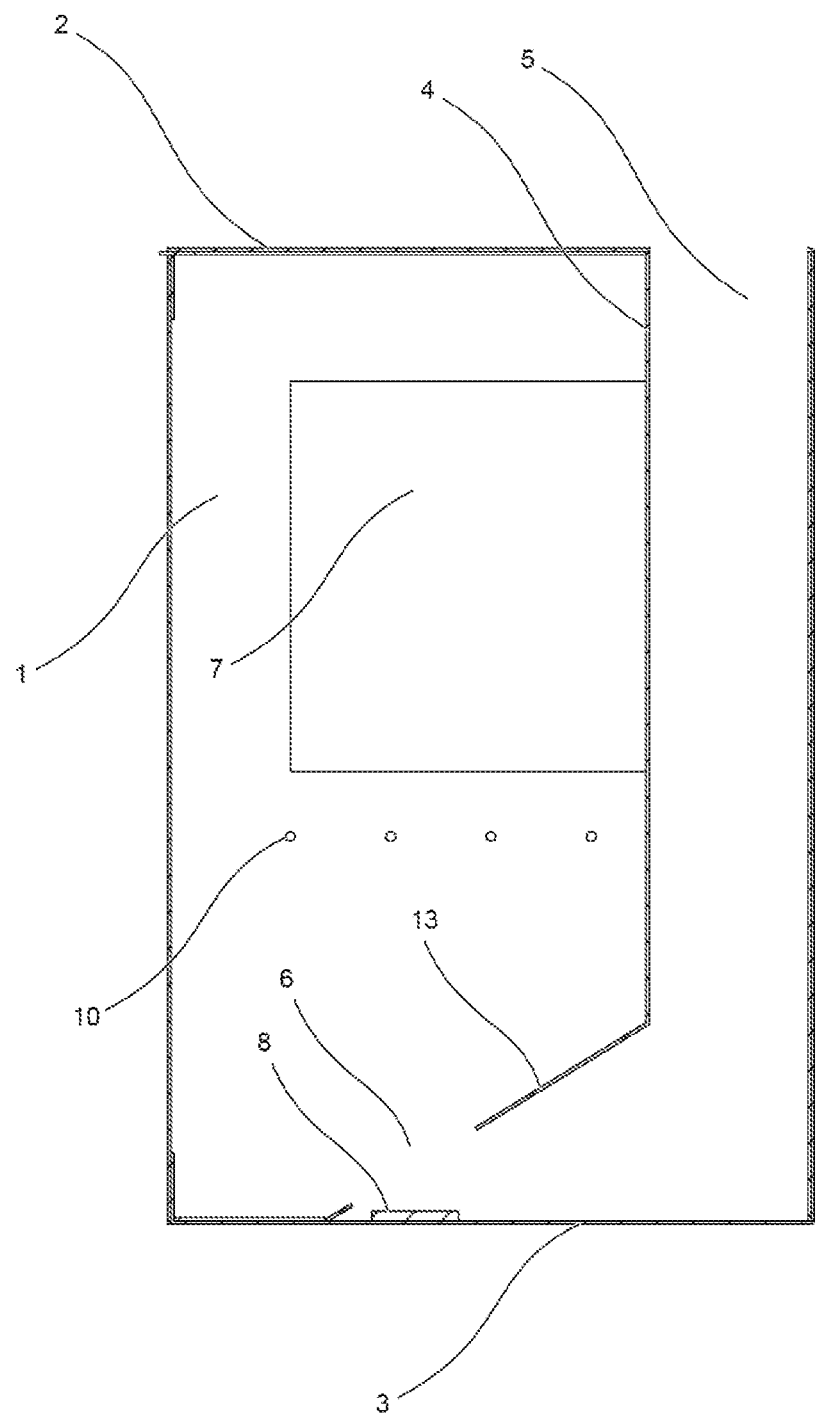
FIG. 2 shows a cross-sectional view of the trap and its operation.

FIG. 2 shows that the element responsible for disorienting any mosquito that enters the trap is the curved inner duct (4); said duct is constructed in such a way that it does not provide a direct line of sight between the open upper entrance (5) and the exit (6) located inside the trap. Bear in mind that light is the main element that can guide a mosquito out of a trap it has entered.

The curved inner duct (4) does not allow for the light that slips into the trap through the open upper entrance (5) to be seen from the inside of the trap or from the exit (6). In order to achieve this functionality, in addition to having a curved shape, the curved inner duct has an incline or bevel (13) at its end located inside the trap, the function of which is to make it impossible to see the light that slips into the trap; the greater the angle of the incline or bevel (13), the greater its capacity to obstruct the view of said light. Furthermore, the exit (6) is located above the top side of said incline or bevel (13) to ensure the proper function of the disorientation system.

The mosquito elimination element implemented in this trap is the use of adhesive for insects, specifically prepared for this purpose, and commercially available. Once said elimination element is placed therein, it is ready for use and remains adhesive until it is covered in insects or foreign matter, that is to say, it does not have a specific service life. Said adhesive is odorless, biodegradable, non-toxic and suitable for implementation in a domestic trap.

FIG. 1 shows the use of translucent windows (7) located in the lateral walls of the main hollow body (1); the internal surface of said translucent windows (7) is coated with adhesive for mosquitoes, such that a mosquito captured inside the trap perceives the light that enters through said translucent windows (7), tries to exit therethrough, and becomes attached to the adhesive for mosquitoes that internally coats the lateral walls. Furthermore, the lateral walls of the main hollow body (1) have a plurality of ventilation holes (10), which allows for air to circulate and maintain a favorable environment inside the trap so that mosquitoes choose to enter and not turn back midway through their path along the curved inner duct (4) where they are still able to perceive the light at the entrance and escape.

Figure 3:
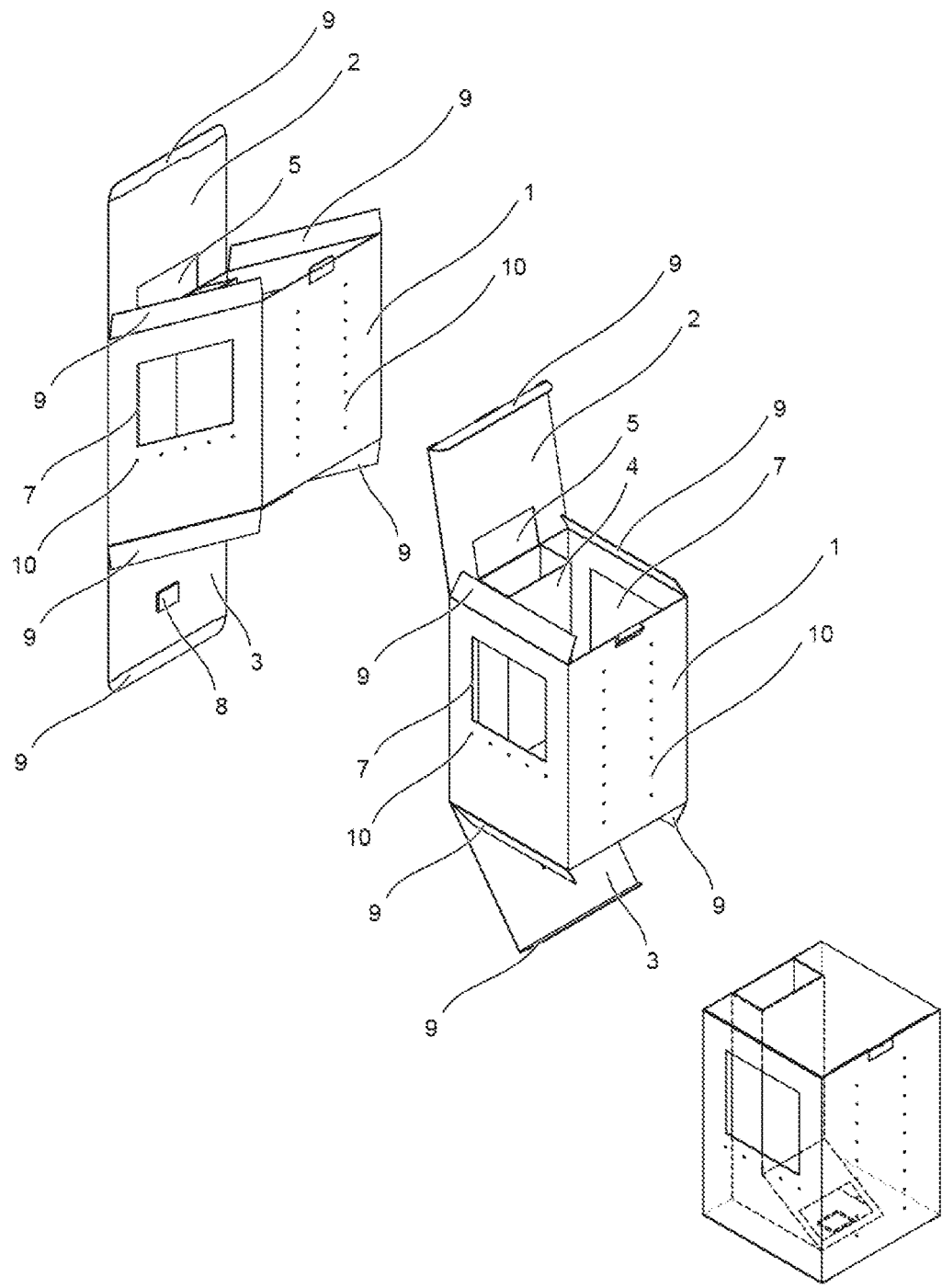
FIG. 3 shows a perspective view of the stages of assembly of the trap, from its collapsed state, to its completely unfolded assembled state.

FIG. 3 shows that the main hollow body (1) must be collapsible, because of which it is manufactured from paper in its preferred embodiments, which can be cardboard or paperboard, making it possible for the trap to have a prism structure with all of its folds marked. The aim of this prism structure is to allow said structure to be collapsed and unfolded, by means of an even number of walls (11) and a single longitudinal gluing (12), in a simple way and without having to perform many operations. In preferred embodiments, the top lid (2) and the bottom lid (3) are responsible for giving structure to the assembled state of the main hollow body (1) when it is unfolded, attaching thereto by means of a system of locking tabs (9). Although in embodiments not illustrated herein, the lids can be attached to the system by overlapping and covering the main hollow body (1) or by inserting them therein. These tabs would still be the element responsible for giving structure to the final form of the main hollow body (1).

Figure 4:
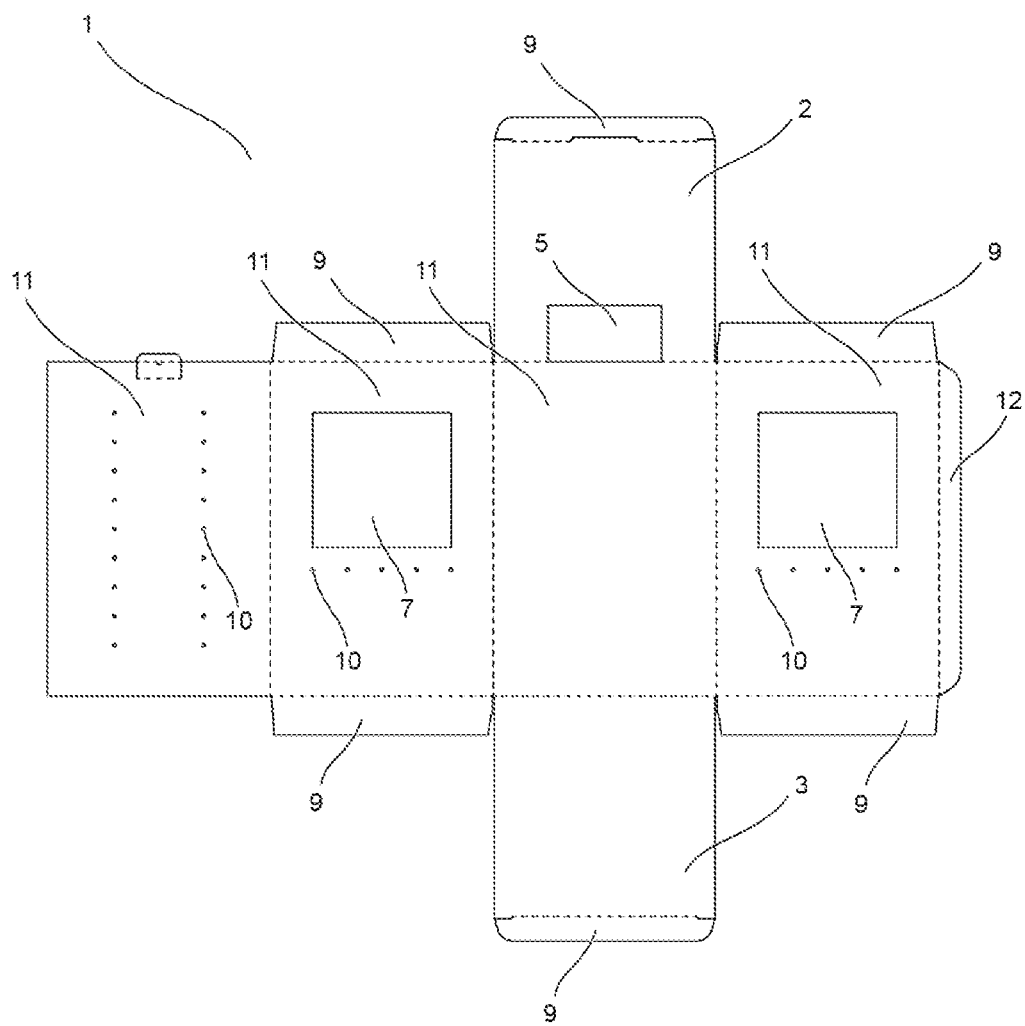
FIG. 4 shows a map view of the die that cuts the main body of the trap.
Figure 5:
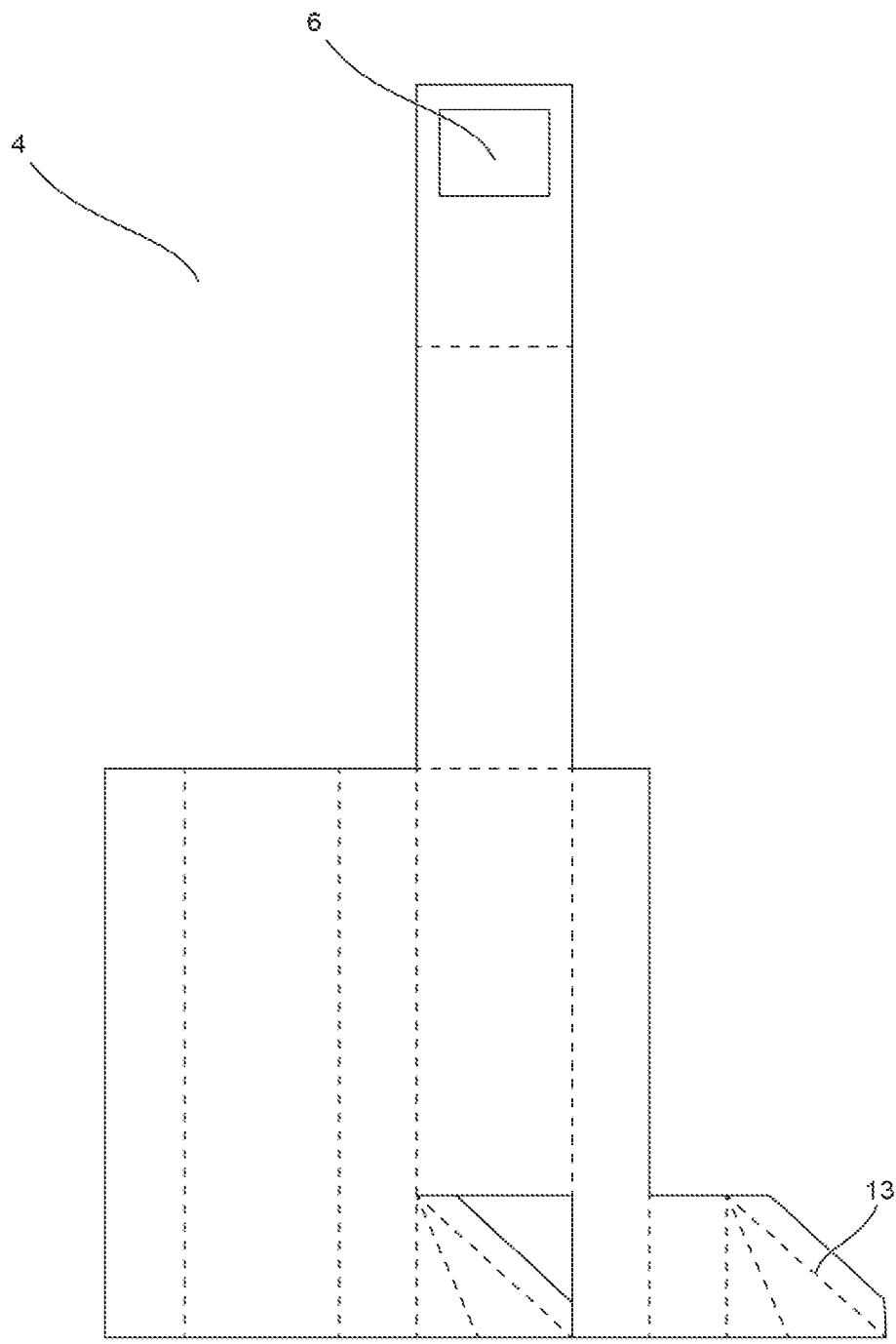
FIG. 5 shows a map view of the die that cuts the inner duct of the trap.

In the preferred embodiment of the invention, illustrated in FIG. 4, the main hollow body (1), the top lid (2), the bottom lid (3) and the locking tabs (9) are manufactured from one single die-cut piece of material, thereby facilitating its manufacture and allowing for most of the structure of the trap to be assembled by means of a single longitudinal gluing (12). The material from which said main hollow body (1) is manufactured is cardboard, which allows it to be die-cut, folded, glued and printed on, in addition to being a cost-effective and easily disposable material. Furthermore, as shown in FIG. 5, the curved inner duct (4) is also manufactured from a single die-cut piece of material, which is folded, fitted with tabs to give it shape and for subsequent installation within the main hollow body (1).

Figure 6:
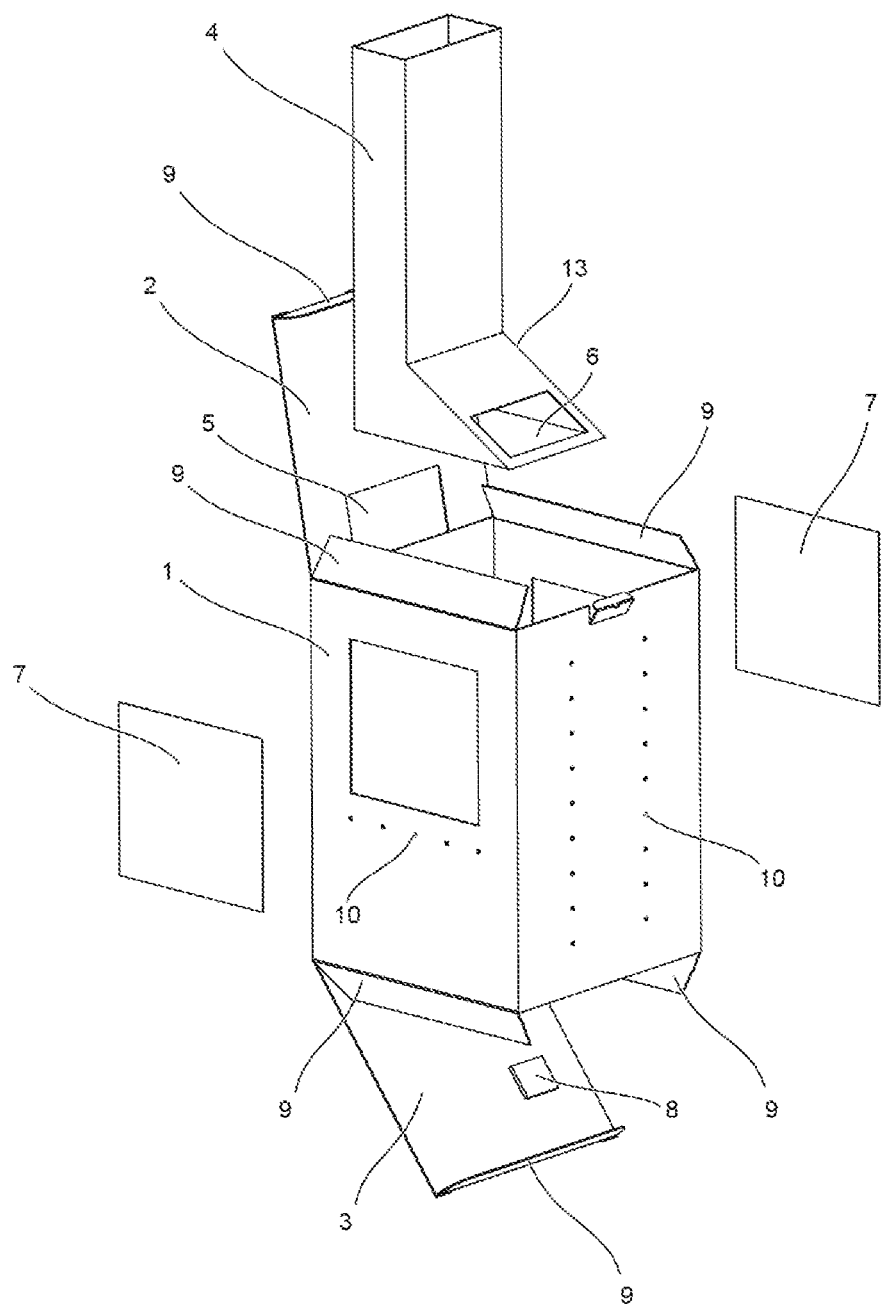
FIG. 6 shows an exploded view of the internal components of the trap.

FIG. 6 shows how the translucent windows (7) coated with adhesive for mosquitoes are attached to the inside of the main hollow body (1) by means of some kind of glue (in preferred embodiments, said glue is acrylic adhesive), and wherein the translucent windows (7) are manufactured from cellulose acetate in preferred embodiments. Finally, in preferred embodiments, the present invention includes surfaces of the translucent windows (7) coated with adhesive, the surface of the bait (8) located on the internal surface of the bottom lid (3) is covered with a thin film of silicon paper, which prevents damage to these surfaces and is easily removed by the user when assembling the trap.

EXAMPLE

In the preferred embodiment of the invention, the main hollow body (1) has a rectangular parallelepiped shape, with a square base with sides measuring between 4 cm and 15 cm, the length of the preferred embodiment being 8 cm; and a height measuring between 6 cm and 25 cm, the length of the preferred embodiment being 10 cm. The main hollow body (1) in the preferred embodiment is entirely manufactured from a single piece of die-cut cardboard, which also includes the top lid (2), the bottom lid (3) and the locking tabs (9). The external side of said piece of die-cut cardboard is printed red (on all of the walls that make up the main hollow body and the top lid (2) and bottom lid (3)) and black (only a fringe around the edge of the open upper entrance (4) and the locking tabs (9)). The main hollow body (1) has a longitudinal fold (12) and the lids (2 and 3) are responsible for giving structure to the assembled rectangular parallelepiped form of the main hollow body (1).

The curved inner duct (4) of the preferred embodiment is manufactured from a single piece of die-cut cardboard and is subsequently assembled by means of tabs, in this case said curved inner duct (4) is printed black on both sides. Once it is assembled, said curved inner duct (4) has a height equal to the height of the main hollow body (1), and a width ranging from 2 cm to 10 cm, the width of the preferred embodiment being 3 cm, a total length ranging from 4 cm to 10 cm, the total length of the preferred embodiment being 10 cm, an entrance depth ranging from 1 cm to 3 cm, the entrance depth of the preferred embodiment being 1.5 cm, an incline or bevel angle (13) ranging from 15° to 35°, the incline or bevel angle (13) of the preferred embodiment being 24° and a square exit (6) with sides measuring between 1 cm and 3 cm, the sides of exit (6) in the preferred embodiment being 2 cm.

Furthermore, after assembly, the curved inner duct (4) is located in such a way that its entrance aligns with the open upper entrance (5) of the top lid (2) and the base of the end that has the incline or bevel (13) rests on the bottom lid (3).

The trap has two translucent windows (7) located in the two lateral walls of the main hollow body (1), said translucent windows (7) are manufactured from cellulose acetate, are internally glued to the main hollow body (1) by means of an acrylic glue and are internally coated with adhesive for mosquitoes. Additionally, there is a plurality of ventilation holes (10) under the translucent windows (7) as well as on the front side of the main hollow body (1). The last aspects of the preferred embodiment that need to be highlighted are the following: first, the bait (8) used is special bait for mosquitoes consisting of a series of combinations of substances based on those present on human skin. It contains three components that mimic said properties, which attract mosquitoes. Said bait is located on the internal surface of the bottom lid (3), attached thereto by means of double-sided tape. Second, the preferred embodiment has a silicon paper cover located on the surfaces coated with adhesive for mosquitoes and on the bait, in such a way that the cover protects these surfaces and is easily removable by the user when placing and activating the trap.

The invention claimed is:

1. A collapsible insect trap comprising:
    a—a closed main hollow body having a top lid and a bottom lid, the closed main hollow body having an opening on the top lid;
    b—a translucent window located in the closed main hollow body, coated with an adhesive;
    c—a bait, located inside the closed main hollow body; and
    d—an inner cut with an open upper end and a lower end, said inner duct located inside the closed main hollowed body;
    where the open upper end of the inner duct is connected to the closed main hollow body at the opening of the top lid, and the lower end has an exit into the closed main hollowed body;
    wherein the inner duct does not provide a direct line of sight between the opening of the top lid and the exit of the inner duct.

2. The trap from claim 1, wherein the insect to be trapped is *Aedes aegypti*.

3. The trap from claim 1, wherein the geometric shape of the closed main hollow body is a prism.

4. The trap from claim 3, wherein the closed main hollow body, the top lid and the bottom lid are manufactured as a single piece of die-cut cardboard.

5. The trap from claim 3, wherein the top lid and the bottom lid are mechanically attached to the closed main hollow body by means of a system of locking tabs.

6. The trap from claim 3, wherein said closed main hollow body has a plurality of ventilation holes in its lateral and front walls and/or in the translucent window.

7. The trap from claim 3, wherein the closed main hollow body has two translucent windows.

8. The trap from wherein the translucent windows are manufactured from cellulose acetate.

9. The trap from claim 8, wherein the internal surface of the translucent windows manufactured from cellulose acetate is coated with an adhesive for insects.

10. The trap from claim 9, wherein the internal surfaces of the translucent windows manufactured from cellulose acetate coated with an adhesive for insects are covered with silicone paper.

11. The trap from claim 1, wherein the bait is internally located on the bottom lid.

12. The trap from claim 1, wherein the bait is bait for mosquitoes.

13. The trap from claim 1, wherein the inner duct is formed by folding a single piece of die-cut cardboard.

14. The trap from claim 1, wherein the inner duct has a dark color.

15. The trap from claim 1, wherein the inner duct is inclined or beveled at the end where the exit is located.

16. The trap from claim 1, wherein the external surface of the closed main hollow body, the top lid and the bottom lid feature a combination of black and red visual cues that attract insects.

\* \* \* \* \*